United States Patent
Cai et al.

(10) Patent No.: US 8,139,058 B2
(45) Date of Patent: Mar. 20, 2012

(54) HIERARCHICAL TILE-BASED RASTERIZATION ALGORITHM

(75) Inventors: Mike Cai, Newark, CA (US); Frido Garristen, Hayward, CA (US); Ming Chen, San Jose, CA (US)

(73) Assignee: Vivante Corporation, Sunnyvale, CA (US)

( * ) Notice: Subject to any disclaimer, the term of this patent is extended or adjusted under 35 U.S.C. 154(b) by 381 days.

(21) Appl. No.: 11/592,799

(22) Filed: Nov. 3, 2006

(65) Prior Publication Data

US 2011/0234609 A1 Sep. 29, 2011

(51) Int. Cl.
*G06T 15/00* (2011.01)
*G09G 5/00* (2006.01)

(52) U.S. Cl. .................................. 345/419; 345/621

(58) Field of Classification Search .................. 345/419, 345/620, 621, 625, 628, 421
See application file for complete search history.

(56) References Cited

U.S. PATENT DOCUMENTS

| | | | | |
|---|---|---|---|---|
| 5,914,722 A | * | 6/1999 | Aleksic | 345/423 |
| 7,184,059 B1 | * | 2/2007 | Fouladi et al. | 345/604 |
| 7,505,043 B2 | * | 3/2009 | Bourd et al. | 345/557 |

OTHER PUBLICATIONS

Ned Greene, Hierarchical Polygon Tiling with Coverage Masks, Acm 1996.*
S. Molnar, M. Cox, D. Ellsworth, H. Fuchs, A Sorting Classification of Parallel Rendering, IEEE Computer Graphics and Applications, 1994.*

* cited by examiner

*Primary Examiner* — Kee M Tung
*Assistant Examiner* — Carlos Perromat
(74) *Attorney, Agent, or Firm* — David R. Stevens; Stevens Law Group

(57) ABSTRACT

A hierarchical tile-based rasterization method is disclosed. The inventive rasterization algorithm rasterizes pixels in hierarchical rectangles or blocks. The method includes: walking a plurality of tiles of pixels and determining if each tile is valid; breaking each valid tile into a plurality of subtiles and determining if each subtile is valid; breaking each valid subtile into a plurality of quads and determining if each quad is valid; and rendering pixels for each valid quad. These hierarchical levels of block validations are performed in parallel. The inventive rasterization algorithm is further implemented in hardware for better performance.

18 Claims, 5 Drawing Sheets

HIERARCHICAL TILE-BASED RASTERIZATION ALGORITHM

BACKGROUND

1. Field

The invention relates to rasterization algorithms, and more particularly to hierarchical tile-based rasterization algorithms.

2. Related Art

Known in the art are equation based rasterization algorithms. One such algorithm is a parallel algorithm for the rasterization of polygons for 3D Z-buffered graphics implementations. This algorithm represents each edge of a polygon by a linear edge function that has a value greater than zero on one side of the edge and less than zero on the opposite side. The value of the function can be interpolated with hardware similar to hardware required to interpolate color and Z pixel values. In addition, the edge function of adjacent pixels may be computed in parallel. However, this algorithm lacks optimization and specific hardware implementations. It also lacks the usage for rasterizing lines.

Accordingly, there exists a need for an improved equation based rasterization algorithm. The invention addresses such a need. The algorithm in accordance with the invention is a hierarchical, tile-based rasterization algorithm that is optimized for both performance and locality. It also provides for the rasterization of lines.

SUMMARY

A hierarchical tile-based rasterization method is disclosed. The inventive rasterization algorithm rasterizes pixels in hierarchical rectangles or blocks. The method includes: walking a plurality of tiles of pixels and determining if each tile is valid; breaking each valid tile into a plurality of subtiles and determining if each subtile is valid; breaking each valid subtile into a plurality of quads and determining if each quad is valid; and rendering pixels for each valid quad. These hierarchical levels of block validations are performed in parallel. The inventive rasterization algorithm is further implemented in hardware for better performance.

DETAILED DESCRIPTION

The inventive rasterization algorithm rasterizes pixels in hierarchical rectangles or blocks. As each block of the hierarchy is validated, it is passed down the pipe to the next level for validation, until the lowest level is reached. If the lowest level block is valid, its pixels are then rendered. The hierarchical levels of block validations are performed in parallel. The inventive rasterization algorithm is further implemented in hardware for better performance.

The inventive rasterization algorithm is also memory localized, which allows for better memory utilization and a higher chance for cache hits when shading the pixels in a later stage of the pipe. This allows for a higher overall throughput of pixels and hence will render polygons faster than conventional edge-walking or non-memory localized algorithms.

Figure 1:
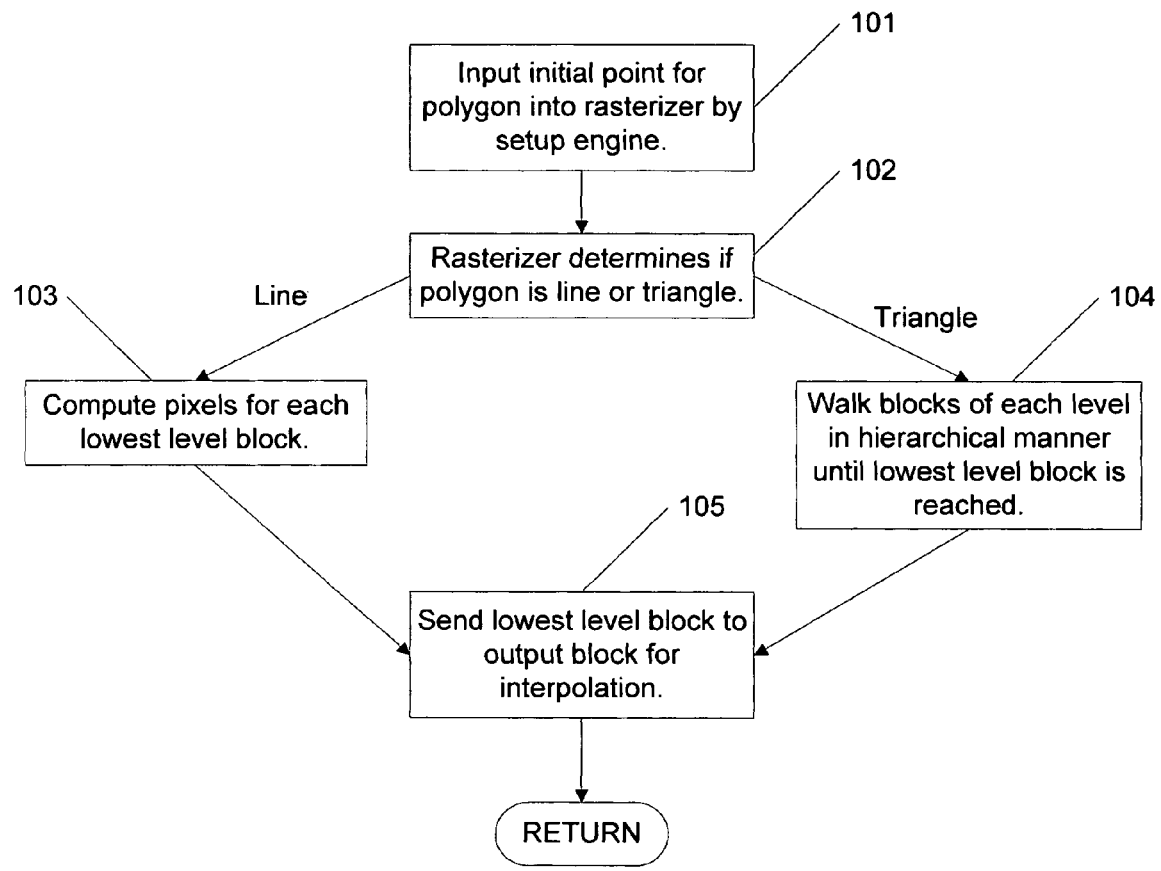
FIG. 1 illustrates an embodiment of the rasterization algorithm in accordance with the invention.

FIG. 1 illustrates an embodiment of the rasterization algorithm in accordance with the invention. First, the initial point for a polygon is input into the rasterizer by a set up engine (step 101). The initial point lies inside a triangle or on a line. The rasterizer determines if the polygon is a line or triangle (step 102). For a line, the rasterizer computes pixels for each lowest level block for the line (step 103). For a triangle, the rasterizer "walks" the blocks of each level in a hierarchical manner until the lowest level block is reached (step 104). The walking of the blocks is described further below. Once the lowest level block is formed, it is sent to an output block for interpolation (step 105). The rasterization algorithm is then repeated for the next polygon.

Figure 2:
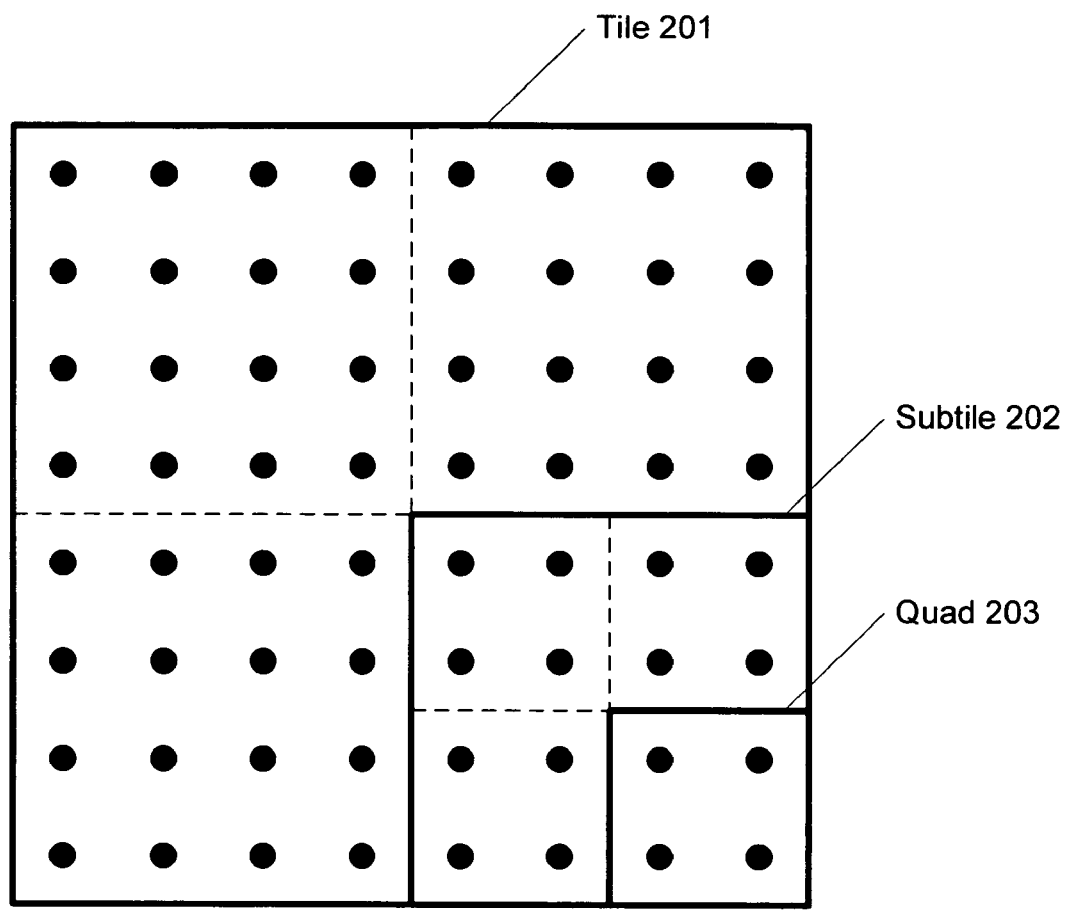
FIG. 2 illustrates an embodiment of a three-level hierarchy used by the rasterization algorithm in accordance with the invention.

In one embodiment, the rasterization algorithm uses a three-level hierarchy. As illustrated in FIG. 2, the highest hierarchical block or "tile" 201 is an 8×8 pixel rectangle. In the next highest hierarchical block, the tile 201, if valid, is divided into four 4×4 pixel "subtiles" 202. In the third highest hierarchical block, each subtile 202, if valid, is divided into four 2×2 pixel "quads" 203. Each valid quad is then rendered. One of ordinary skill in the art will understand that any number or type of hierarchical levels may be used without departing from the spirit and scope of the invention.

Figure 3:
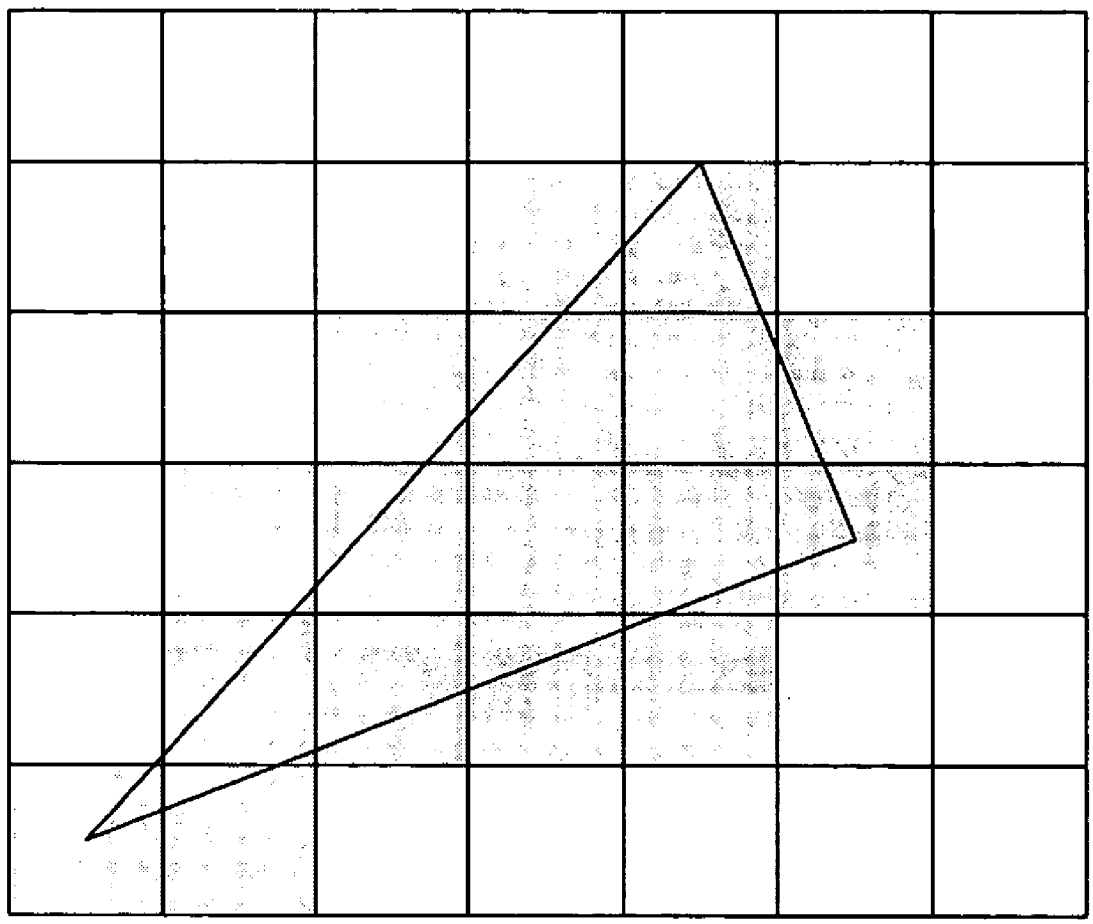
FIG. 3 illustrates an example triangle and tiles.

When the rasterizer walks the tiles, it walks each horizontal line of tiles in a similar fashion. FIG. 3 illustrates an example triangle and tiles. In one embodiment, the rasterizer first walks in one direction until it reaches the outer bounds of the triangle or clipping window, and then in the other direction from the initial point until it reaches the outer bounds of the triangle or clipping window. The rasterizer then proceeds either upwards or downwards, as determined by the location of the initial point, to the next line of tiles until it reaches the outer bounds of the triangle or clipping window from wherever it left off.

If the initial point is somewhere in the middle of the triangle, it will first proceed upwards until the outer limits of the triangle or clipping window are reached. The rasterizer then proceeds downwards from the initial point.

Figure 4:
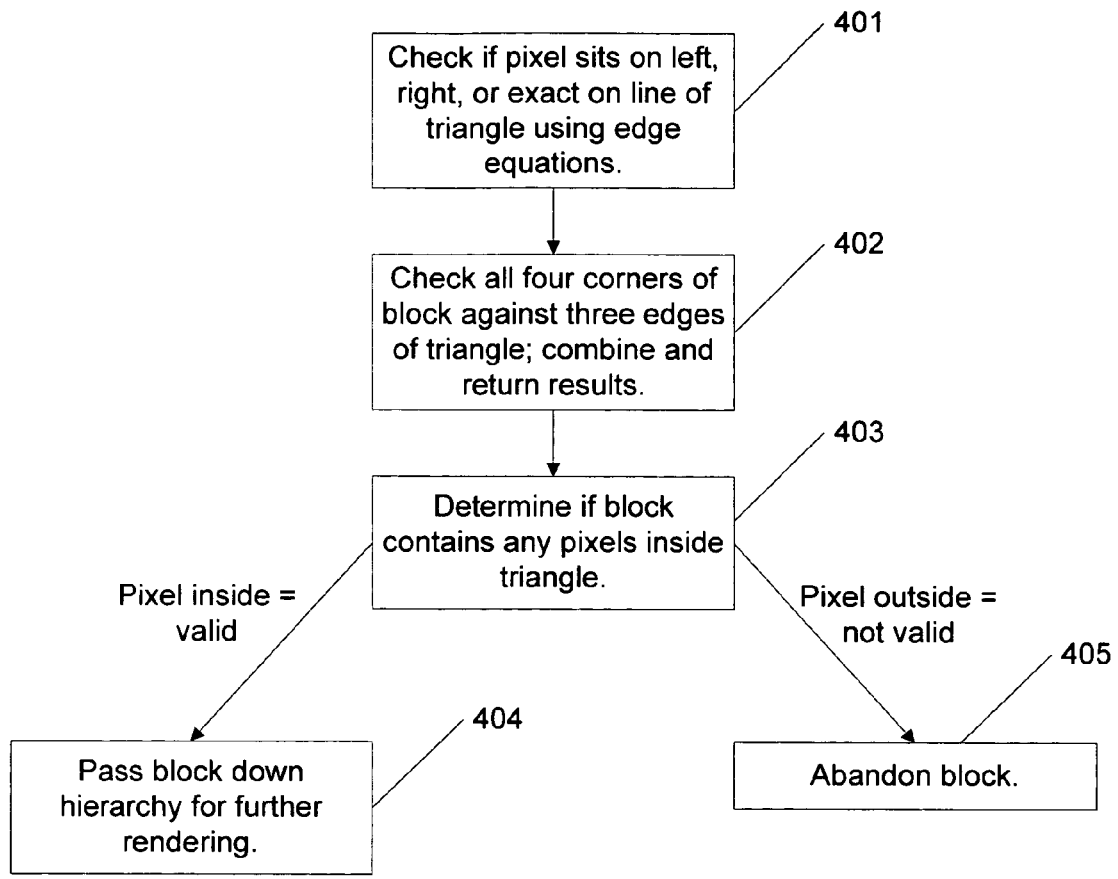
FIG. 4 illustrates an embodiment of a validation algorithm used with the rasterization algorithm in accordance with the invention.

FIG. 4 illustrates an embodiment of a validation algorithm used with the rasterization algorithm in accordance with the invention. The validation algorithm determines if a block (tile, subtile, or quad) contains any pixels inside a triangle. First, the rasterizer checks if a pixel sits on the left, right, or exactly on a line of the triangle using edge equations (step 401):

$$E(x,y) = (x - X\text{init}) * dY - (y - Y\text{init}) * dX.$$

All four corners of a block are checked against the three edges of the triangle, and all four corner checking results are combined (step 402). The rasterizer then determines if the block contains any pixels inside the triangle (step 403). If it does, i.e., the block is valid, then the block is passed down the hierarchy for further rendering (step 404). If it does not, i.e., the block is not valid, then the block is abandoned (step 405).

In this embodiment, three edge equations are used on each edge of the block. Multiplexing schemes are used so that in each cycle, the status for the entire block as checked against the triangle is computed. With this computed information at hand, the rasterizer can also determine if there is still a valid block on the left and right of the current block. This will help the rasterizer to determine in which direction to continue.

Figure 5:
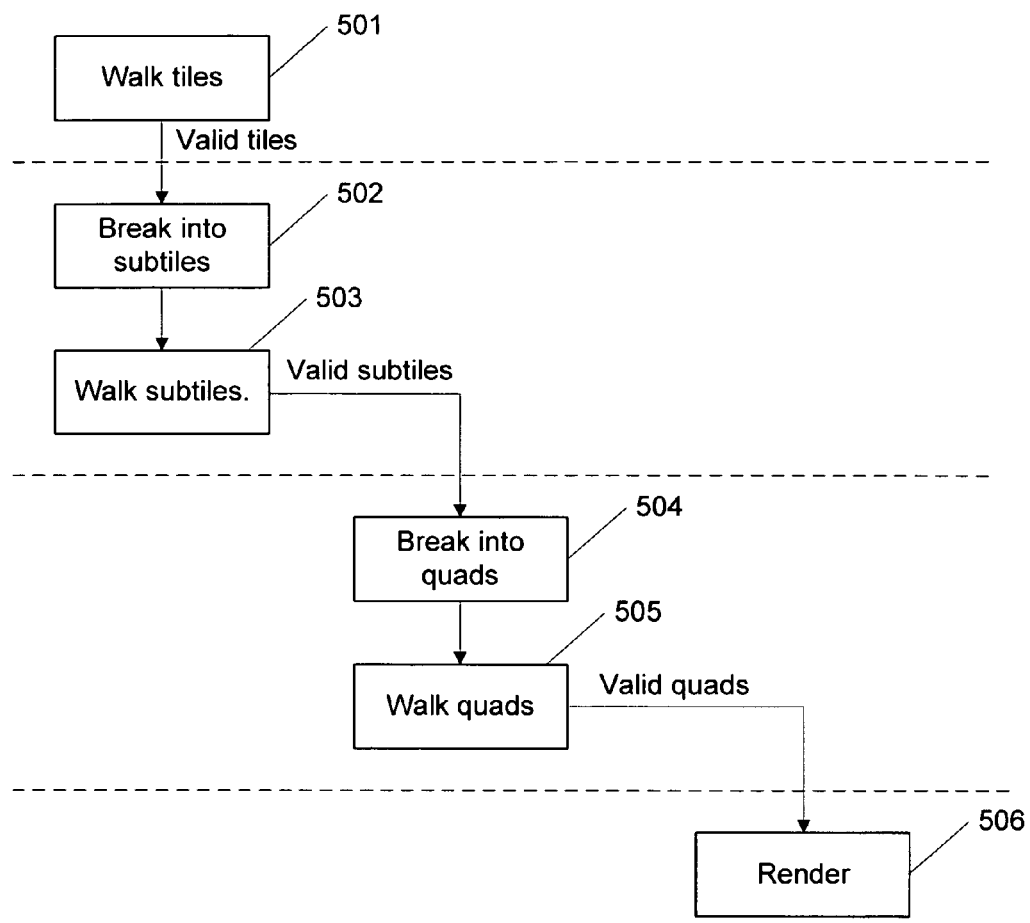
FIG. 5 illustrates an embodiment of the hierarchical triangle rasterization algorithm in accordance with the invention.

FIG. 5 illustrates an embodiment of the hierarchical triangle rasterization algorithm in accordance with the invention. First, the rasterizer walks the tiles as described above (step 501). The rasterizer determines if a tile is valid using the validation algorithm set forth in FIG. 4. If a tile is not valid, then it is abandoned. If a tile is valid, then it is passed to the next level of the hierarchy, where the tile is broken into subtiles (step 502). The rasterizer then walks the subtiles (step 503) and determines if any are valid using the validation algorithm set forth in FIG. 4. Subtiles that are not valid are abandoned. Valid subtiles are passed to the next level of the hierarchy, where the subtile is broken into quads (step 504). The rasterizer then walks the quads (step 505) and determines if any are valid using the validation algorithm set forth in FIG. 4. Quads that are not valid are abandoned. Valid quads are rendered (step 506).

In the above embodiment, as a valid tile is passed to the next level and steps 502-503 are performed, the rasterizer walks to the next tile and proceeds to process that tile. As a valid subtile is passed to the next level and steps 504-505 are performed, the rasterizer walks to the next subtile and proceeds to process that subtile. As a valid quad is passed and is rendered per step 506, the rasterizer walks to the next quad and proceeds to process that quad. In this manner, the rasterization of the tiles, subtiles, and quads in the hierarchical levels are performed in parallel. The rasterization of each block within a level is also performed in parallel. The inventive rasterization algorithm is thus optimized. To further optimize the algorithm, the rasterizer walks the tiles, subtiles, and quads in the same manner to maintain memory coherency.

In one embodiment, the rasterization algorithm supports a special double-depth mode, where the depth values for two adjacent pixels are computed in one cycle. Thus, a 2×2 pixel quad will only take two cycles to compute, instead of the four cycles required without this mode (one cycle for each pixel). This allows for applications such as video games to render their depth buffer quicker, so that in the second stage of rendering, only the pixels that are valid (i.e., depth value matches the depth buffer) will be sent down for pixel processing. This helps overall performance of games. In general, in double-depth mode, the rendering performance is 2× to 4× of the normal rendering mode.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A hierarchical memory localized triangle rasterization method, comprising the steps of:
   (a) walking a plurality of tiles of pixels and determining if each tile is valid;
   (b) breaking each valid tile into a plurality of subtiles and determining if each subtile is valid;
   (c) breaking each valid subtile into a plurality of quads and determining if each quad is valid; and
   (d) rendering pixels for each valid quad, wherein steps (a) through (d) are performed in parallel;
   and wherein the walking step (a) comprises determining a walk direction from each tile according to whether the tile is determined to be valid.

2. The method of claim 1, wherein the breaking step (b) comprises:
   (b1) breaking each valid tile into the plurality of subtiles;
   (b2) walking the plurality of subtiles; and
   (b3) determining if each subtile is valid.

3. The method of claim 2, wherein the walking of the plurality of subtiles is performed in a same manner as the walking of the plurality of tiles.

4. The method of claim 1, wherein the breaking step (c) comprises:
   (c1) breaking each valid subtile into the plurality of quads;
   (c2) walking the plurality of quads; and
   (c3) determining if each quad is valid.

5. The method of claim 4, wherein the walking of the plurality of quads is performed in a same manner as the walking of the plurality of tiles and a walking of the plurality of subtiles.

6. The method of claim 1, wherein validation of a block, wherein the block comprises a tile, a subtile, or a quad, comprises:
   checking if a pixel in the block is found in an area of the screen where pixels belonging to the inside of the triangle are present using edge equations;
   checking four corners of the block against three edges of the triangle and returning a combined result;
   determining if the block contains any pixels inside the triangle, based on the combined result; and
   determining that the block is valid, if the block contains at least one pixel inside the triangle.

7. The method of claim 6, further comprising:
   abandoning the block, if the block does not contain at least one valid pixel inside the triangle.

8. The method of claim 1, wherein the walking step (a) comprises: determining whether a tile is valid; and
   according to the determination, determining which of two adjoining tiles along a walk direction are valid.

9. A hierarchical memory localized rasterization method, comprising the steps of:
   (a) inputting an initial point for a primitive;
   (b) determining if the primitive is a line or a triangle; and
   (c) if the polygon is a triangle, rasterizing the triangle in a hierarchical manner, comprising:
   (c1) walking a plurality of tiles of pixels and determining if each tile is valid;
   (c2) breaking each valid tile into a plurality of subtiles and determining if each subtile is valid;
   (c3) breaking each valid subtile into a plurality of quads and determining if each quad is valid; and
   (c4) rendering pixels for each valid quad, wherein steps (c1) through (c4) are performed in parallel;
   wherein determining if a block is valid, wherein the block comprises a tile, a subtile, or a quad, comprises:
   checking four corners of the block against edges of the triangle and returning a combined result;
   determining if the block contains any pixels inside the triangle, based on the combined result; and
   determining that the block is valid, if the block contains at least one pixel inside the triangle;
   and wherein the walking step (c1) comprises determining a walk direction from each tile according to whether the tile is determined to be valid.

10. The method of claim 9, wherein the breaking step (c2) comprises:
    (c2i) breaking each valid tile into the plurality of subtiles;

(c2ii) walking the plurality of subtiles; and
(c2iii) determining if each subtile is valid.

11. The method of claim 10, wherein the walking of the plurality of subtiles is performed in a same manner as the walking of the plurality of tiles.

12. The method of claim 9, wherein the breaking step (c3) comprises:
(c3i) breaking each valid subtile into the plurality of quads;
(c3ii) walking the plurality of quads; and
(c3iii) determining if each quad is valid.

13. The method of claim 12, wherein the walking of the plurality of quads is performed in a same manner as the walking of the plurality of tiles and a walking of the plurality of subtiles.

14. The method of claim 9, further comprising:
abandoning the block, if the block does not contain at least one valid pixel inside the triangle.

15. The method of claim 9, further comprising:
(d) if the primitive is a line, computing pixels for each quad of pixels for the line; and
(e) rendering pixels for each valid quad.

16. A method for validation of a block of pixels in a hierarchical memory localized triangle rasterization method, comprising the steps of:

(a) checking if a pixel in the block is found in an area of the screen where pixels belonging to the inside of the triangle are present using edge equations;
(b) checking four corners of the block against three edges of the triangle and returning a combined result;
(c) determining if the block contains any pixels inside the triangle, based on the combined result; and
(d) determining that the block is valid, if the block contains at least one valid pixel inside the triangle;
wherein a walk direction from each tile is determined according to whether the tile is determined to be valid.

17. The method of claim 16, further comprising:
(e) abandoning the block, if the block does not contain at least one pixel inside the triangle.

18. The method of claim 16, wherein the steps (a) through (d) are performed to validate a plurality of tiles of pixels, a plurality of subtiles, and a plurality of quads,
wherein a valid tile is broken into the plurality of subtiles,
wherein a valid subtile is broken into the plurality of quads,
wherein the validation of the plurality of tiles, the plurality of subtiles, and the plurality of quads are performed in parallel.

* * * * *